United States Patent [19]

Kousaka et al.

[11] Patent Number: 5,673,747
[45] Date of Patent: Oct. 7, 1997

[54] REAR AIR-CONDITIONING UNIT FOR USE IN VEHICLE

[75] Inventors: Hideki Kousaka, Higashihiroshima; Hideaki Yasuda; Kenji Kamigasa, both of Hiroshima; Makoto Nishimuta, Hiroshima-ken, all of Japan

[73] Assignee: Japan Climate Systems Corporation, Hiroshima-ken, Japan

[21] Appl. No.: 374,108

[22] Filed: Jan. 18, 1995

[30] Foreign Application Priority Data

Sep. 30, 1994 [JP] Japan .................. 6-236843

[51] Int. Cl.⁶ .................................................. F24F 1/00
[52] U.S. Cl. .................. 165/41; 165/76; 165/122; 62/243; 62/244; 416/187; 416/178; 415/53.1
[58] Field of Search .................. 165/41, 122, 42, 165/43, 76; 62/243, 244; 416/187, 178; 415/53.1

[56] References Cited

U.S. PATENT DOCUMENTS

| | | | |
|---|---|---|---|
| 2,804,756 | 9/1957 | Faulhaber et al. | 62/243 |
| 3,142,160 | 7/1964 | Hiyoshi et al. | 62/243 |
| 3,147,368 | 9/1964 | Walker | 165/122 |
| 3,595,029 | 7/1971 | Leude, Jr. | 62/244 |
| 4,401,013 | 8/1983 | Ohashi et al. | 165/42 |
| 4,417,636 | 11/1983 | Mazur | 165/122 |
| 4,672,819 | 6/1987 | Mino et al. | 165/76 |
| 4,898,003 | 2/1990 | Ichikawa et al. | 62/244 |
| 4,958,504 | 9/1990 | Ichikawa et al. | 165/122 |
| 5,054,378 | 10/1991 | Speece | 62/244 |
| 5,167,129 | 12/1992 | Akasaka | 165/43 |

FOREIGN PATENT DOCUMENTS

| | | | |
|---|---|---|---|
| 0038652 | 3/1979 | Japan | 165/122 |
| 0019633 | 2/1983 | Japan | 165/122 |
| 0028426 | 1/1989 | Japan | 165/122 |

*Primary Examiner*—John K. Ford
*Attorney, Agent, or Firm*—Morrison & Foerster LLP

[57] ABSTRACT

A blower means is provided by a cross flow fan 4 in which a plurality of axially extending blades 13 are arranged in rows in a circumferential direction and connected axially with connecting plates 14 interposed therebetween. The cross flow fan 4 is positioned generally horizontal in a widthwise direction of the vehicle. A heat exchanger 2 is disposed on the suction side of the cross flow fan 4 and in the front-and-rear direction of the vehicle, while an air inlet port 6 and an air blowoff port 7 of a casing 1 are opened to the rear parcel panel P. The casing 1 is vertically divided into an upper casing 1a and a lower casing 1b by a plane containing a rotating shaft 5 of the cross flow fan 4. An air passage from the air inlet port 6 to the air blowoff port 7 of the casing 1 is formed into a generally U-shape.

7 Claims, 11 Drawing Sheets

5,673,747

REAR AIR-CONDITIONING UNIT FOR USE IN VEHICLE

BACKGROUND OF THE INVENTION

1. Field of the Invention

The present invention relates to a rear air-conditioning unit for use in a vehicle, and more particularly, to a rear air-conditioning unit for use in a vehicle which unit is provided on a lower surface of a rear parcel panel of the vehicle to cool the air in the rear of the passenger compartment of the vehicle.

2. Description of the Prior Art

Conventionally, some vehicles such as cars are provided with air-conditioning units not only on the front but also on the rear of the passenger compartment. This type of air-conditioning unit, as shown in FIG. 22, consists of a refrigerating cycle which comprises a compressor 101, a heat exchanger (condenser) 102, a dryer receiver 103, and two heat exchangers (evaporators) 104, 104 connected in parallel. One heat exchanger 104 is for use in the front, on inlet side of which an expansion valve 105 provided. The other heat exchanger 104 is for use in the rear, on inlet side of which an expansion valve 105 and a solenoid valve 106 are provided. The solenoid valve 106 is arranged to control the refrigerant supply to the rear heat exchanger 104.

The rear heat exchanger 104, the expansion valve 105, and the solenoid valve 106 are contained, as shown in FIG. 23, in a casing 109 together with a centrifugal fan 107 and an air filter 108 as a rear cooler unit, and installed on the lower surface of the rear parcel panel P of the vehicle. Within the casing 109, the centrifugal fan 107 and the heat exchanger 104 are disposed side by side in a widthwise direction of the vehicle, and the air filter 108 is disposed above the centrifugal fan 107. Also, the casing 109 has an air inlet port 110 formed above the air filter 108, and two air blowoff ports 111 formed at a location apart from the air inlet port 110 with the heat exchanger 104 interposed therebetween.

The air inlet port 110, as shown in FIG. 24, is opened on the rear parcel panel P of the vehicle. A blowoff duct 112 is attached to each of the two air blowoff ports 111. These blowoff ducts 112 are provided along lower part of the rear parcel panel P to the inside of right and left roof pillars, and led to blowoff openings 113 provided at the upper ends of the pillars.

In this air-conditioning unit, inside air sucked from the air inlet port 110 via the air filter 108 in an axial direction of the centrifugal fan 107 is blown radially by the centrifugal fan 107. Then the air passes through the heat exchanger 104, where it is cooled, and passes through the blowoff ducts 112 via the air blowoff ports 111. Thus, the air is blown into the vehicle inside through the blower holes 113.

The air-conditioning unit to be installed on the rear parcel panel P of the vehicle in the manner described above is demanded for reduction in size and thickness so that the trunk room will not be narrowed, and that the air-conditioning unit will not make an obstacle to speakers for audio use, extractors for exhaust of the inside air, and high-mount stop lamps to be installed on the rear parcel panel P.

However, the conventional air-conditioning unit has had limitations in reducing the size and thickness because of the employment of the centrifugal fan 107 as a blower. In more detail, when the rotating shaft of the centrifugal fan 107 is positioned vertical as shown in FIG. 23, the fan motor of the centrifugal fan 107 is located below the centrifugal fan 107 so that the air-conditioning unit cannot be thinned vertically. Even if the rotating shaft of the centrifugal fan 107 is positioned horizontal, the unit would thicken vertically to an extent of the diameter of the fan.

Further, in the conventional air-conditioning unit, since the air inlet port 110 and the air blowoff ports 111 are located right and left with the heat exchanger 104 interposed therebetween, the air blowoff ports 111 would be one-sided either rightward or leftward in the widthwise direction of the vehicle. For this reason, cool air would need to be led to positions symmetrical between right and left inside the vehicle with the blowoff ducts 112, so as to be blown off evenly into the vehicle inside. The presence of such blowoff ducts 112 would cause the air-conditioning unit to be increased in size, and moreover result in increase in an air-pass resistance.

SUMMARY OF THE INVENTION

The present invention has been developed to substantially eliminate the above-described disadvantages.

It is therefore an object of the present invention to provide a rear air-conditioning unit for use in a vehicle which air-conditioning unit can be reduced in size and thickness and which can ensure a sufficient quantity of air with less air-pass resistance.

Another object of the present invention is to suppress an occurrence of noise and foreign sounds, and to improve an immediate effect on cooling and a ventilation characteristic.

In order to achieve the aforementioned object, there is provided, as a first means, a rear air-conditioning unit for use in a vehicle which is provided on a lower surface of a rear parcel panel of the vehicle, the unit having a heat exchanger which constitutes a refrigerating cycle; an air blower means for sucking air contained in the vehicle to subject the air to heat exchange with a refrigerant contained in the heat exchanger and then blowing off the air into the vehicle; and a casing for accommodating the heat exchanger and the air blower means, characterized in that:

the air blower means comprises a cross flow fan having a plurality of axially extending blades arranged in rows in the circumferential direction and connected axially with connecting plates interposed therebetween, and a fan motor which is connected to one end of a rotating shaft of the cross flow fan and which drives the cross flow fan into rotation, the rotating shaft of the cross flow fan being positioned in generally horizontal in a widthwise direction of the vehicle;

the heat exchanger constituting the refrigerating cycle is positioned on a suction side of the cross flow fan and generally parallel to the rotating shaft of the cross flow fan; and the casing is composed on an upper casing and a lower casing which are divided vertically by a plane containing the rotating shaft of the cross flow fan, the casing having an air inlet port and an air blowoff port provided in a front-and-rear direction of the vehicle and opened to the rear parcel panel, and an air passage formed in a generally U-shape which leads to the air blowoff port from the air inlet port.

According to the first means, air sucked through the air inlet port in a direction perpendicular to the axis of the cross flow fan is cooled while passing through the heat exchanger, and blown off by the cross flow fan through the air blowoff ports toward the inside of the vehicle.

Also, the cross flow fan is placed on the lower casing and the upper casing is installed thereon. Thus, the rotating shaft of the cross flow fan is supported by the lower casing and the upper casing.

Further, the air sucked through the air inlet port, passing through the generally U-shaped air passage, is smoothly blown off through the air blowoff ports.

According to the invention of the first means, since the cross flow fan is employed as a blower and the cross flow fan is disposed in generally horizontal, the unit can be reduced in thickness and size. Also, since the air inlet port and the air blowoff port are opened to the rear parcel panel, the need of blowoff ducts connecting to the blowoff openings as provided in conventional unit is now eliminated, so that the unit can be further downsized.

As a result, the trunk room space below the rear parcel panel can be broadened, while audio speakers, high-mount stop lamps, and other parts to be attached on the rear parcel panel can be laid out without hindrance.

Moreover, since the casing is divided into two, the number of parts involved is small while the cost required is low. Also, since the rotating shaft of the cross flow fan can be supported by the upper casing and the lower casing, the unit can be assembled easily and promptly.

Further, since the air passage from the air inlet port to the air blowoff port is generally U-shaped, air flow becomes smooth and the shortest. As a result, the air-pass resistance is decreased so that the air volume can be increased to a large extent. Also, the front-to-rear size of the unit is reduced, so that the unit can be downsized.

As a second means, in the above-described rear air-conditioning unit for use in a vehicle, dementions of the air blowoff port of the casing are determined within preffered ranges; and dementions of a rear guider and a tongue portion formed in the casing around the cross flow fan are also determined within preferred ranges.

In the second means, the appropriately disposed rear guider and tongue portions prevent the air that flow along the inner surfaces of the casing from causing peel-off or turbulent flow, so that the air flow velocity becomes uniform and that the air flow becomes stable. Besides, a large quantity of air is efficiently blown off through the optimized blowoff ports at uniform flow velocity and with low noise.

According to the second means, wide and uniform-velocity air flow of large quantity can be efficiently blown off by virtue of the appropriately determined shape of the casing on the cross flow fan blowoff side as well as the optimized air blowoff port. Besides, the unit can be reduced in noise, becoming more resistant to surging.

As a third means, in above-described rear air-conditioning unit for use in a vehicle, the width of the air blowoff port of the casing in the widthwise direction of the vehicle is determined within preferred range.

In the third means, air is blow off comfortably to rear-seat passengers from the air blowoff ports that are sized according to the widthwise size of the vehicle.

According to the third means, comfortable air can be blown to rear-seat passengers according to the width of the vehicle.

As a fourth means, in the above-described rear air-conditioning unit for use in a vehicle, it is possible that either one of the air inlet port or the air blowoff port of the casing is disposed at the center and the other is disposed on both sides, wherein both of them are disposed in the widthwise direction of the vehicle on the rear parcel panel.

In the fourth means, air is sucked from the center of the rear parcel panel and blown off from both sides. Otherwise, air is sucked from both sides of the rear parcel panel and blown off from the center.

According to the fourth means, either one of the air inlet port or the air blowoff port is arranged at the center and the other is arranged on both sides, and they are arranged on the rear parcel panel in a line in the widthwise direction of the vehicle. As a result, air suction and blowoff can be effected evenly between right and left.

As a fifth means, in the above-described rear air-conditioning unit for use in a vehicle, it is also possible that partition walls extending from a vicinity of the corresponding coupling plates of the cross flow fan to a vicinity of the heat exchanger are provided on the air inlet side of the cross flow fan, whereby the air passage to the cross flow fan is separated.

In the fifth means, air cooled during passage through the heat exchanger is rectified into proper flow by partition walls, smoothly sucked into the cross flow fan, and blown off uniformly.

According to the fifth means, the flow of air sucked to the cross flow fan is rectified by partition walls. As a result, forced vortexes are generated within the cross flow fan in a steady state everywhere, so that the blown-off air velocity distribution is uniformed and that noise (rustles) will not be generated due to surging or the like.

As a sixth means, in the above-described rear air-conditioning unit for use in a vehicle, it is also possible that a blowoff duct communicating with the air blowoff port is provided in the widthwise direction of the vehicle on the rear parcel panel, and small blowoff ports directed toward the front of the vehicle are provided at the center and on both sides of the blowoff duct.

In the sixth means, air is blown off from the small blowoff ports of the blowoff ducts comfortably to rear-seat passengers.

According to the sixth means, air will be blown to the heads of rear-seat passengers with efficiency, to their comfort.

As a seventh means, in the above-described rear air-conditioning unit for use in a vehicle, it is also possible that the casing is provided with an air return passage for communicating the air blowoff side of the cross flow fan with the air inlet side of the heat exchanger.

As an eighth means, in the above-described rear air-conditioning unit for use in a vehicle, it is also possible that the blowoff duct is provided with an air return passage for communicating the blowoff duct with the air inlet side of the heat exchanger.

In the seventh or eighth means, part of air cooled by the heat exchanger and blown off by the cross flow fan passes through the air return passage, returning to the air inlet side of the heat exchanger, and recooled by the heat exchanger.

According to the seventh means and the eighth means, since part of blown-off air returns through the air return passage to the heat exchanger, where it is recooled. As a result, the blowoff temperature can be lowered. Therefore, even immediately after the air-conditioning unit is started into operation in summer, there is no possibility that hot air may be blown off, but cool air is blown off. Thus, a immediate effect on cooling is obtained for passengers to be comfortable.

As a ninth means, in the above-described rear air-conditioning unit for use in a vehicle, it is also possible that the casing is provided with an exhaust port for communicating the air blowoff side of the cross flow fan with a trunk space below the rear parcel panel, and an exhaust door that can selectively switch between the exhaust port and the air blowoff port.

In the ninth means, when the exhaust door is switched to the exhaust port side, inside polluted air or high-temperature air is exhausted by the cross flow fan through the exhaust port to the outside of the vehicle.

According to the ninth means, even when inside air has been polluted by smokes of cigarettes or the like, or when the vehicle interior has been heated to high temperature over a long-time parking under the summer burning sun, the polluted air or hot air can be discharged promptly to the outside of the vehicle through the exhaust port by switching over the exhaust door.

BRIEF DESCRIPTION OF THE DRAWINGS

Further objects and advantages of the present invention will become clear from the following description taken in conjunction with the preferred embodiments thereof with reference to the accompanying drawings.

DETAILED DESCRIPTION OF THE PREFERRED EMBODIMENTS

Figure 1:
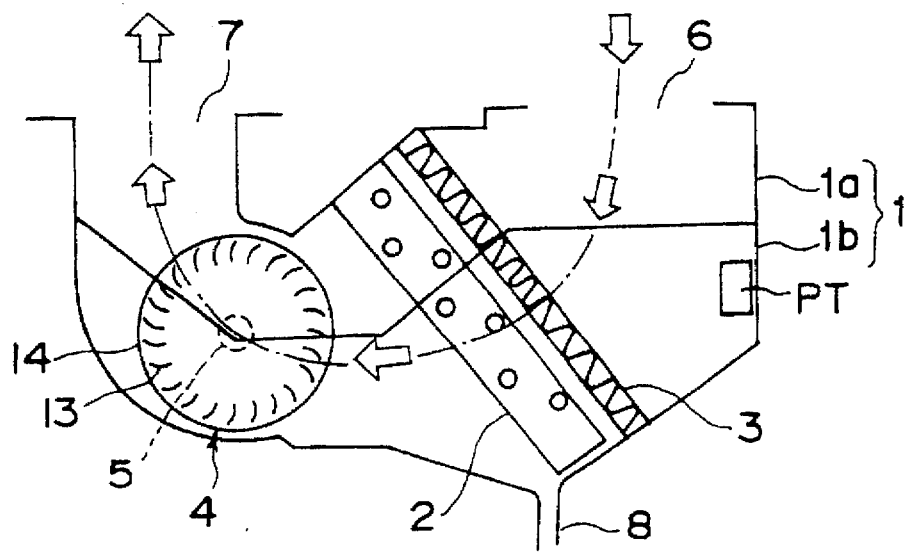
FIG. 1 is a sectional view of the rear cooler unit according to a first embodiment of the present invention.
Figure 2:
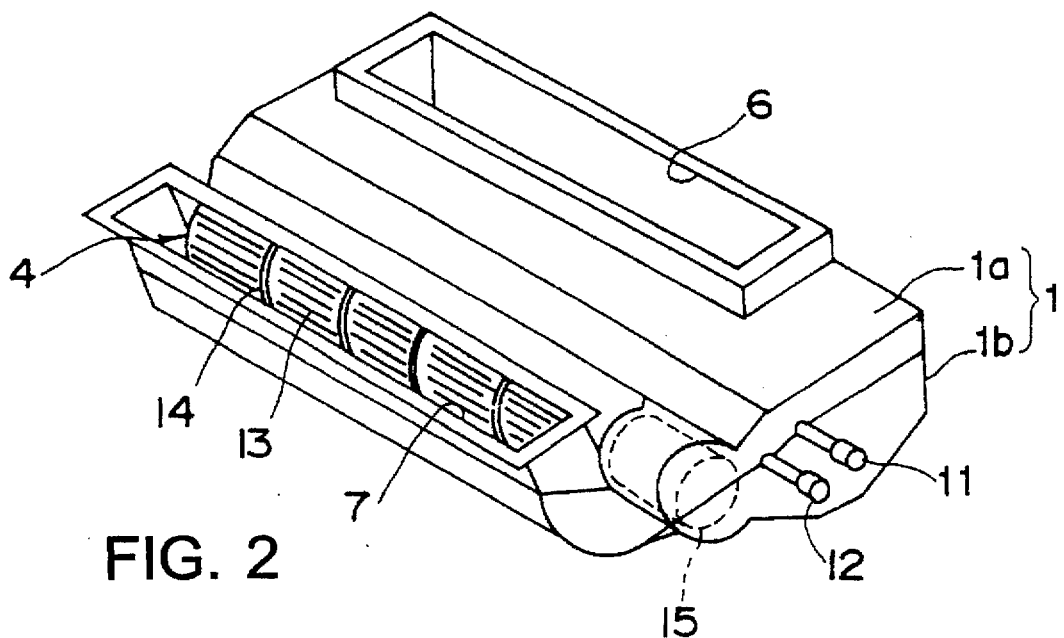
FIG. 2 is a perspective view of the rear cooler unit of FIG. 1.
Figure 3:
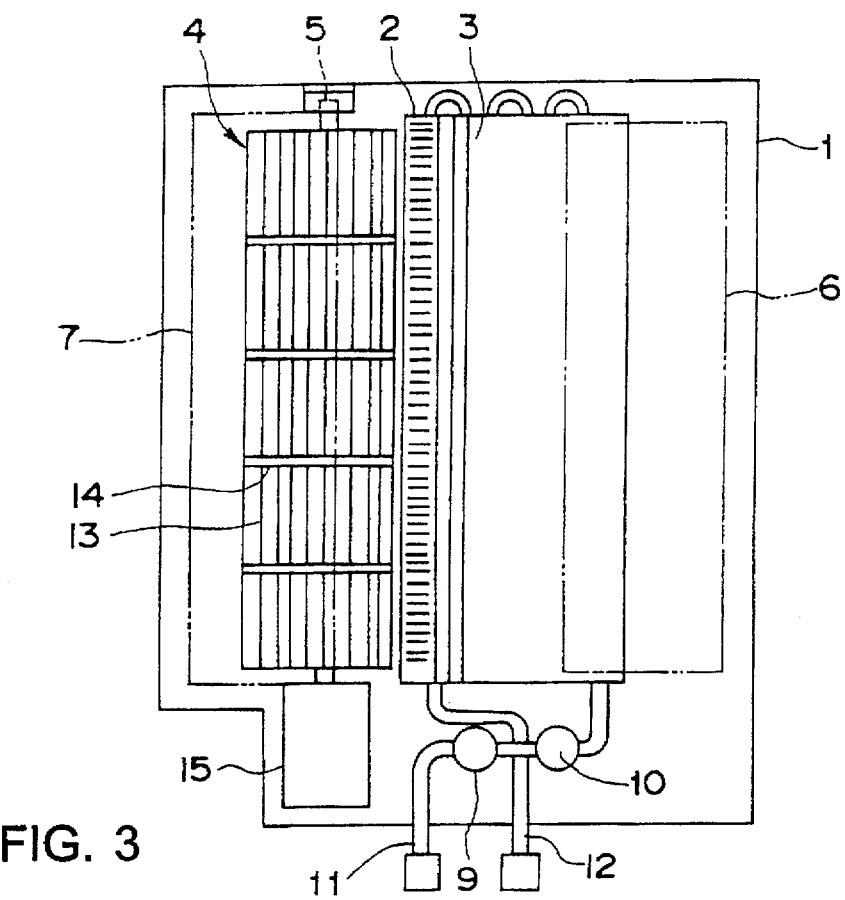
FIG. 3 is a plan view in section of the rear cooler unit of FIG. 1.

FIGS. 1 to 3 illustrate a rear air-conditioning unit for use in a vehicle (hereinafter, referred to as a rear cooler unit) according to a first embodiment of the present invention.

This rear cooler unit is so arranged that a heat exchanger 2, an air filter 3, and a cross flow fan 4 are accommodated in a casing 1.

The casing 1 is divided into an upper casing 1a and a lower casing 1b by a plane containing a rotating shaft 5 of the cross flow fan 4. On the upper surface of the upper casing 1a are formed an air inlet port 6 and an air blowoff port 7, which have an elongated rectangular shape parallel to the rotating shaft 5 of the cross flow fan 4. On the bottom surface of the lower casing 1b, a drainage port 8 is provided on the air outlet side of the heat exchanger 2, so that moisture contained in the air that has been cooled and condensed by the heat exchanger 2 will be discharged to the outside of the vehicle. The interior of the casing 1 forms an air passage of a generally U-shape that leads to the air blowoff port 7 from the air inlet port 6.

Figure 22:
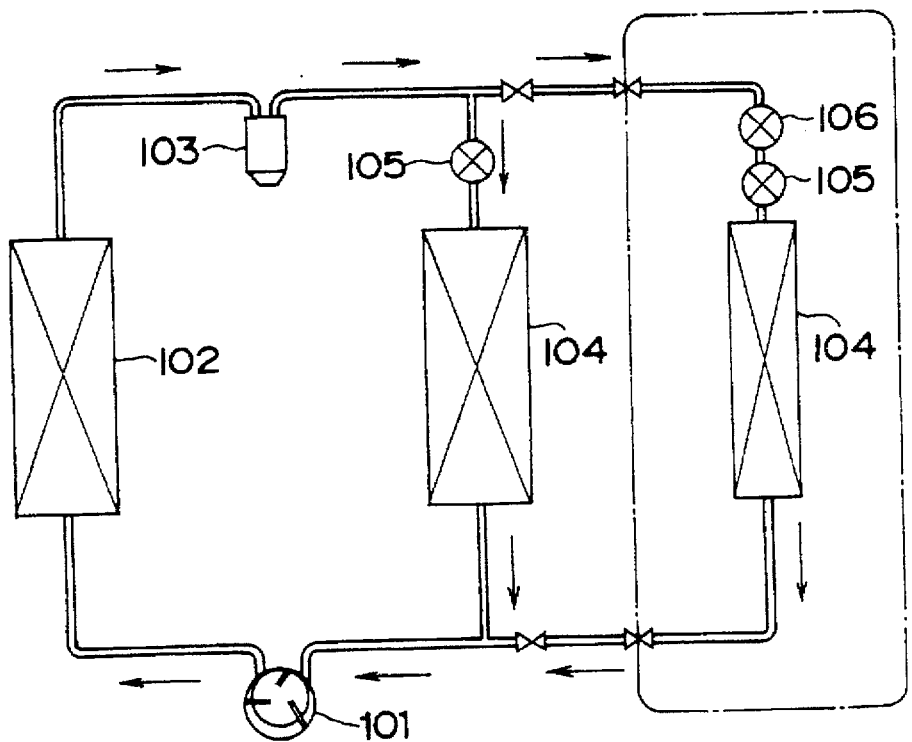
FIG. 22 is a view showing the refrigerating cycle of a air-conditioning unit for use in a vehicle.
Figure 23:
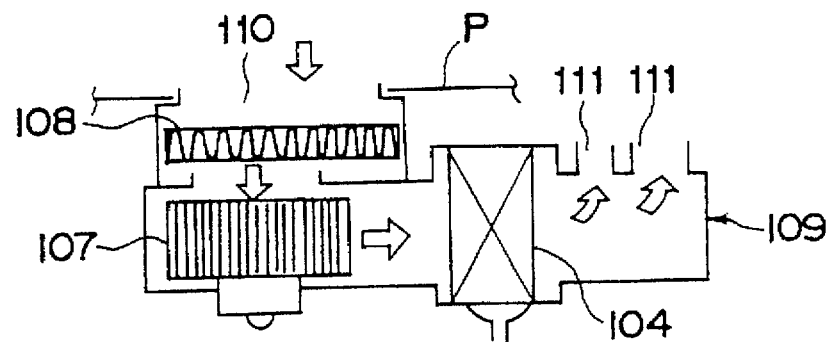
FIG. 23 is a sectional view of a conventional rear cooler unit.
Figure 24:
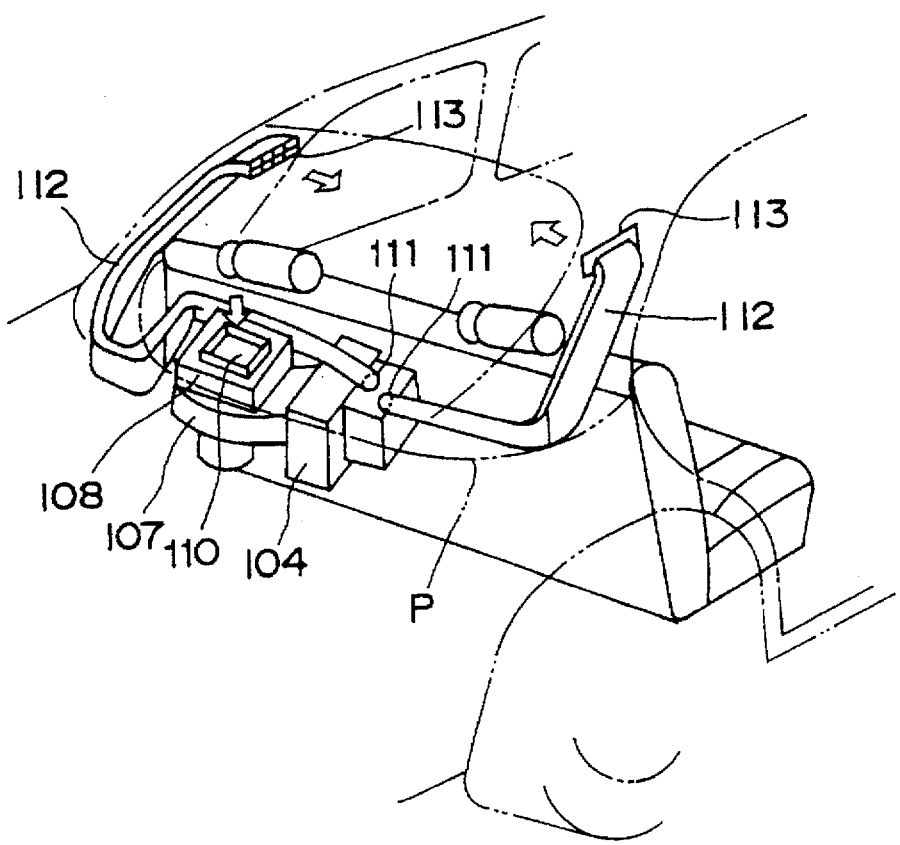
FIG. 24 is a perspective view showing a state how the rear cooler unit of FIG. 23 is mounted to the vehicle.

The heat exchanger 2 is an evaporator constituting the refrigerating cycle, the evaporator being arranged so as to be tilted with its air inlet side directed obliquely upward to face the air inlet port 6. A refrigerant inlet tube 11, which is provided with a solenoid valve 9 and an expansion valve 10, and a refrigerant outlet tube 12 are protruded from the outer surface of the casing 1, and are to be connected to a heat exchanger i.e. condenser and a compressor positioned outside the passenger compartment, respectively (see FIG. 22).

The air filter 3 is placed so as to be close to the air inlet side of the heat exchanger 2.

The cross flow fan 4 has a plurality of axially extending blades 13 arranged in rows in a circumferential direction and connected in an axial direction with connecting plates 14 interposed therebetween. This cross flow fan 4 is so positioned that the rotating shaft 5 becomes generally horizontal at a location where it faces the air blowoff port 7 on the air outlet side of the heat exchanger 2. The cross flow fan 4 is rotatably supported by the rotating shaft 5 which is held between the upper casing 1a and the lower casing 1b. A fan motor 15 for driving the cross flow fan 4 is provided on the same side as the refrigerant inlet tube 11 and outlet tube 12 of the heat exchanger 2, and connected to one end of the rotating shaft 5 of the cross flow fan 4.

The width of the heat exchanger 2, the axial length of the cross flow fan 4, and the widths of the air inlet port 6 and the air blowoff port 7 are all approximately the same length, as shown in FIG. 3.

Figure 4:
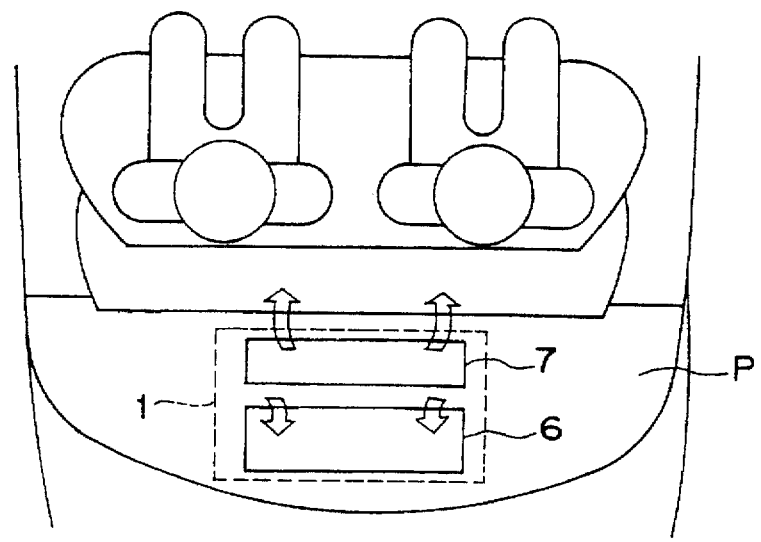
FIG. 4 is a plan view of rear part of a vehicle, showing the air inlet port and the air blowoff port of the rear cooler unit of FIG. 1.

The rear cooler unit of the above-described construction is installed on the lower surface of the rear parcel panel P of the vehicle in such a manner that, as shown in FIG. 4, the air inlet port 6 is located rearward and the air blowoff port 7 is located forward. The air inlet port 6 and the air blowoff port 7 are opened on the rear parcel panel P.

In FIG. 1, reference character PT denotes a heat-generating part such as a power transistor or a resistor used for the control unit that controls the rotation of the fan motor 15 of the cross flow fan 4. This part PT is installed on the air passage between the air inlet port 6 and the heat exchanger 2, and is to be cooled efficiently by air passing through this air passage.

In this rear cooler unit, when an unshown rear cooler switch is turned on, the solenoid valve 9 opens and the fan motor 15 is driven so that the cross flow fan 4 rotates. As a result, inside air sucked through the air inlet port 6 is first cleaned by the air filter 3 and then passes through the heat exchanger 2, where it is cooled by heat exchange with the refrigerant. Thereafter, the air is blown off to the vehicle inside by the cross flow fan 4 through the air blowoff port 7.

The rear cooler unit uses the cross flow fan 4 of cross flow type that air crosses the axis perpendicularly, eliminating the need of any special inlet passage or blowoff passage but only requiring the cross flow fan 4 to be disposed on the U-shaped passage within the casing 1. Thus, the rear cooler unit can be reduced in size and thickness. Also, since the heat exchanger 2 is arranged so as to be tilted, a large inlet-side area can be ensured and moreover the vertical size can be reduced so that the rear cooler unit can be provided as a thin type. Besides, the space can be effectively utilized by virtue of the arrangement that the air inlet port 6 and the air blowoff port 7 are opened to the rear parcel panel P, eliminating the need of ducts, which would conventionally be involved, and that the refrigerant inlet and outlet tubes 11, 12 of the heat exchanger 2 are located on the same side as the fan motor 15 of the cross flow fan 4. Thus, the rear cooler unit has become compact.

The air passage from the air inlet port 6 to the air blowoff port 7 is generally U-shaped, being not only the shortest path but also of such a shape as will not disturb the intake flow and blowoff flow of air by the cross flow fan 4 disposed in the U-shaped path. Thus, forced vortexes in the cross flow fan 4 can be stabilized, so that the fan performance is improved, less noise and less foreign sounds are generated, and that wide air flow can be blown into the vehicle inside from the air blowoff port 7 without using an air guider formed of another component.

Next, a preferably shape of the rear cooler unit or the air-conditioning unit of the above embodiment is described with reference to FIGS. 5 to 7.

The shape of the air blowoff port 7 of the casing 1 is defined so as to be within the following ranges. Assuming that the length in the widthwise direction of the vehicle is a (see FIG. 6), the length in the longitudinal direction of the vehicle is b (see FIG. 5), and the width of the cross flow fan 4 in the direction of its rotating shaft is L (see FIG. 6), then:

$a/L \leq 1.10$ (preferably, $a/L=0.90$)

$0.08 \leq b/L \leq 0.19$ (preferably, $b/L=0.12$).

Figure 8:
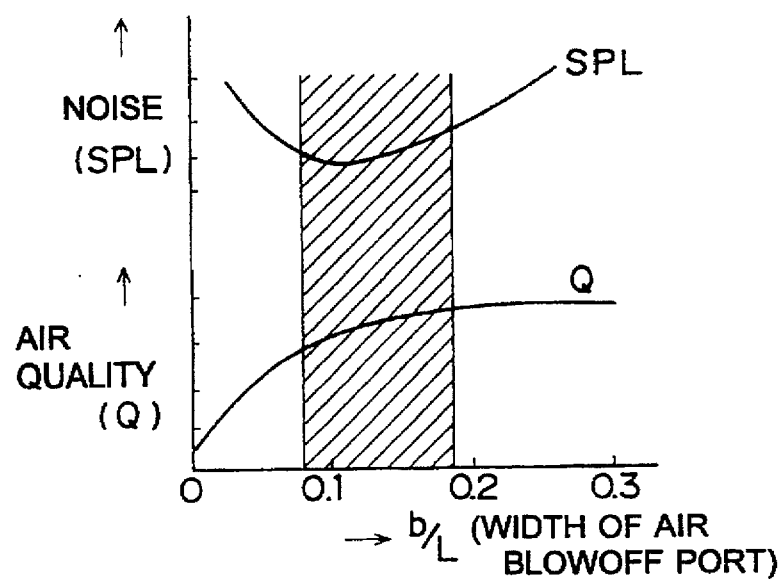
FIG. 8 is a graph showing variations in noise and air volume relative to b/L.

As apparent from FIG. 8, if b/L is within the aforenoted range, less noise results and large quantity of air can be ensured.

Figure 5:
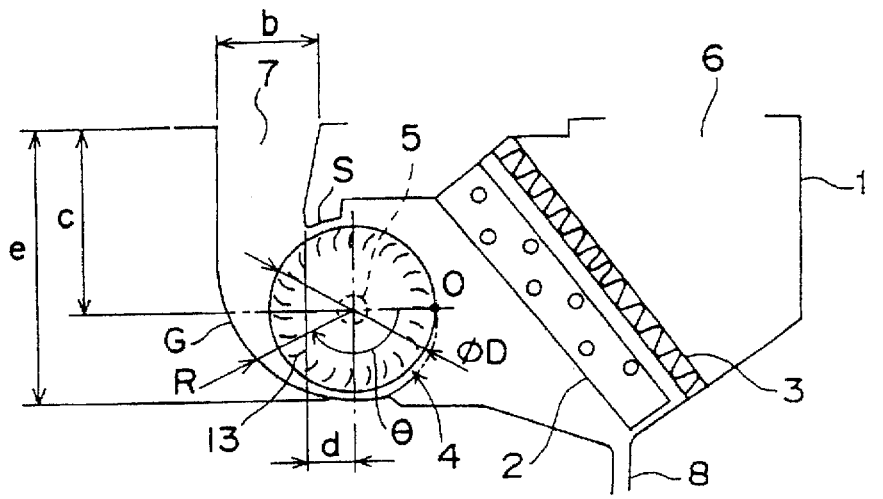
FIG. 5 is a sectional view showing the dimensional relation around the scroll fan of the rear cooler unit.
Figure 6:
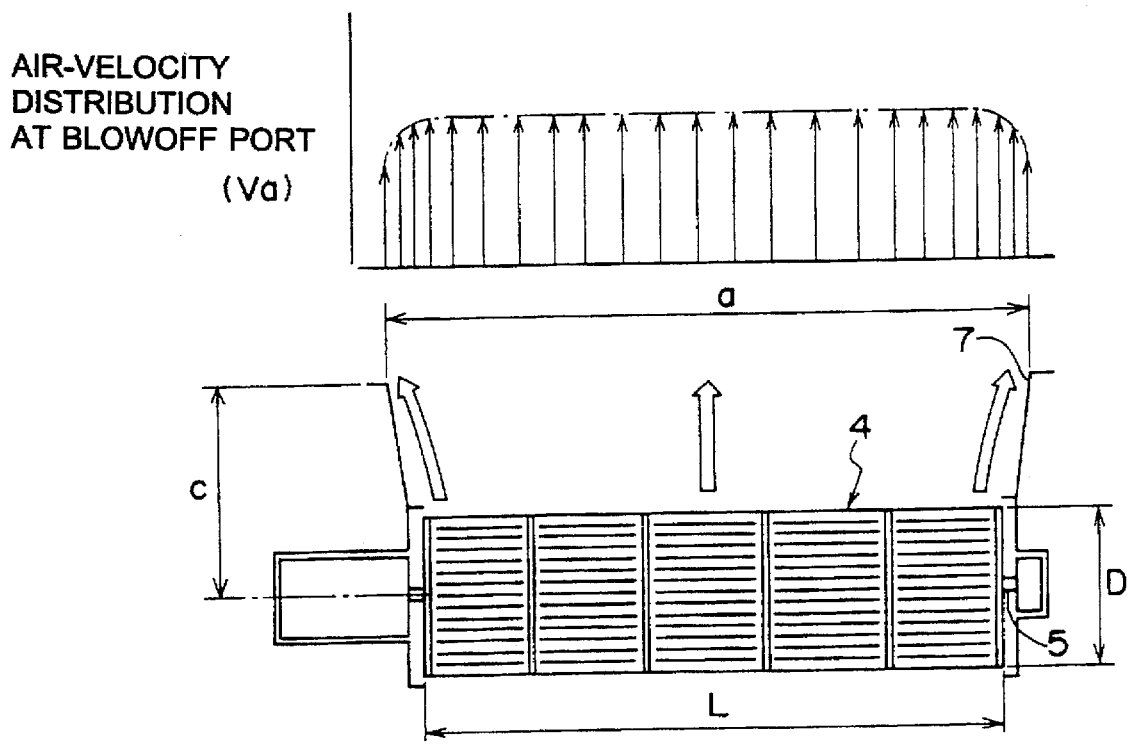
FIG. 6 is a sectional view showing the dimensional relation of the air blowoff port of the rear cooler unit to the scroll fan and a graph showing the air-velocity distribution at the blowoff port.

As shown in FIG. 5, if the height from the rotating shaft 5 of the cross flow fan 4 is c, the height from the bottom of the casing 1 is e, and if the diameter of the blades 13 of the cross flow fan 4 is D, then the height of the air blowoff port 7 can be expressed by the following equation:

$c/D \geq 0.75$ (preferably, $c/D=0.90$)

$e/D \leq 2.00$ (preferably, $e/D=1.70$)

Figure 7:
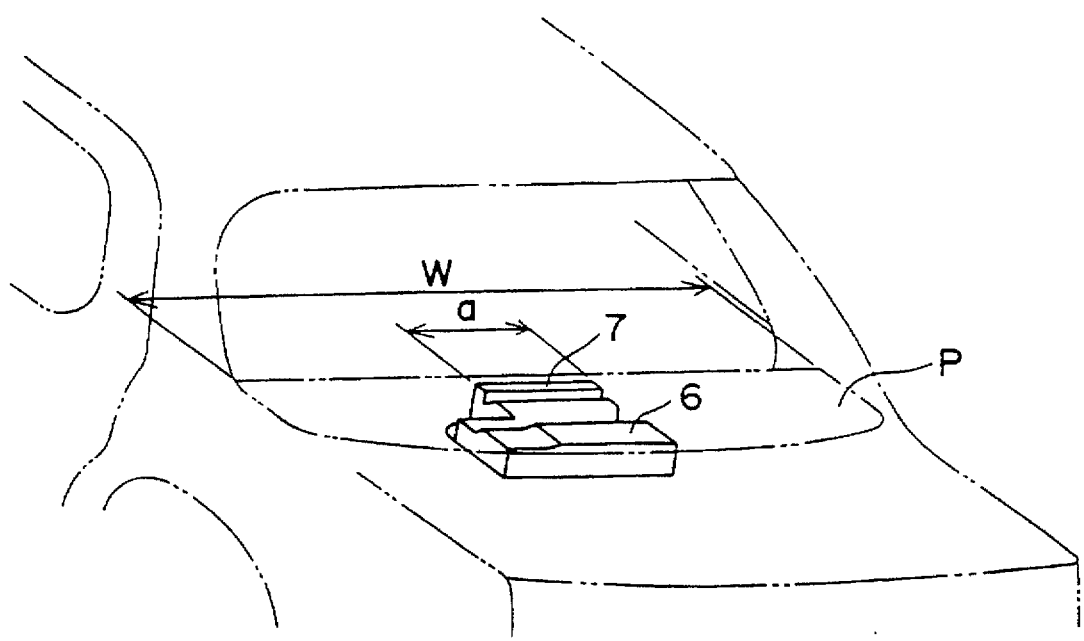
FIG. 7 is an internal perspective view of the vehicle, showing the dimensional relation of the air blowoff port of the rear cooler unit to the rear parcel panel.

Further, as shown in FIG. 7, if the length of the air blowoff port 7 in the widthwise direction of the vehicle is a, and if the length of the vehicle's rear parcel panel P in the widthwise direction of the vehicle is W, then the size of the air blowoff port 7 is determined so that $a/W \geq 0.12$ (preferably, $a/W=0.22$).

Meanwhile, as shown in FIG. 5, a rear guider G is formed in the casing 1 below the air blowoff side of the cross flow fan 4. If the radius of the rear guider G with the rotating shaft 5 of the cross flow fan 4 taken as the center is R, the diameter of the blades 13 of the cross flow fan 4 is D, the factor represented by tan α, where α is the expansion angle (in degree) is A, and if the angle from the fulcrum O is θ (in radian), then the shape of the rear guider G is a logarithmic spiral form that can be expressed by the following equation:

$R=(D/2)e^{A\theta}$.

Figure 9:
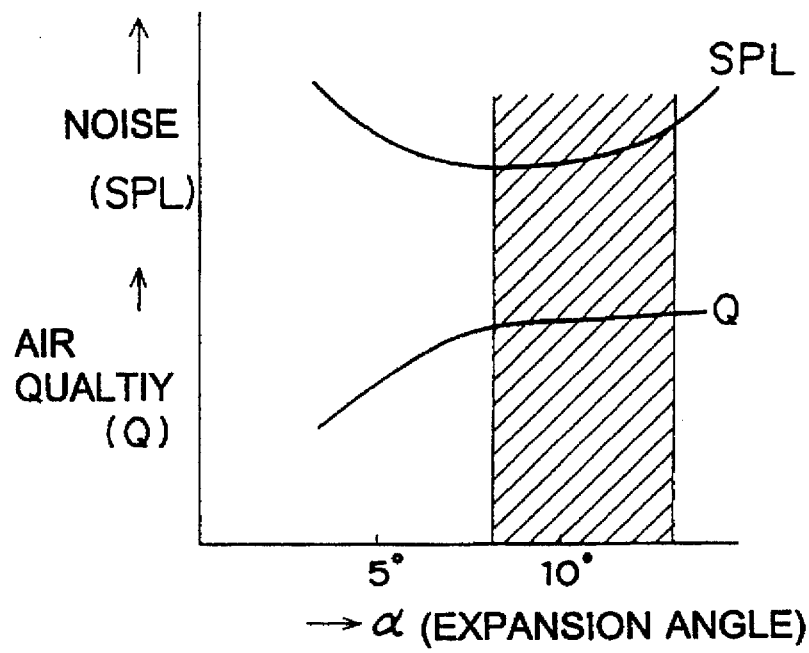
FIG. 9 is a graph showing variations in noise and air volume relative to α.

The relation between noise and air quantity relative to the expansion angle α is shown in FIG. 9. Hence, a preferable expansion angle α is α=8° to 13° (more preferably, α=10°).

Figure 10:
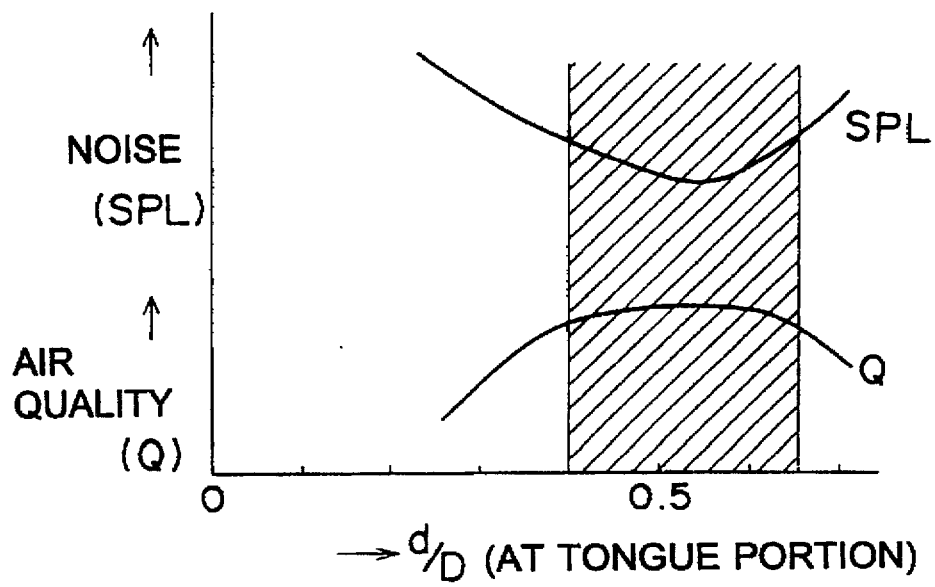
FIG. 10 is a graph showing variations in noise and air volume relative to d/D.

Also, a tongue portion (stabilizer) S is formed in the casing 1 above the air blowoff side of the cross flow fan 4. Now, if the horizontal distance from the rotating shaft 5 of the cross flow fan 4 to the end of the tongue portion S is d, and if the diameter of the blades 13 of the cross flow fan 4 is D, then the noise and the quantity of air will vary as shown in FIG. 10 due to variation of d/D. According, the value of d/D is preferably determined to be within a range of:

$0.40 \leq d/D \leq 0.65$ (preferably, $d/D=0.54$).

Figure 11:
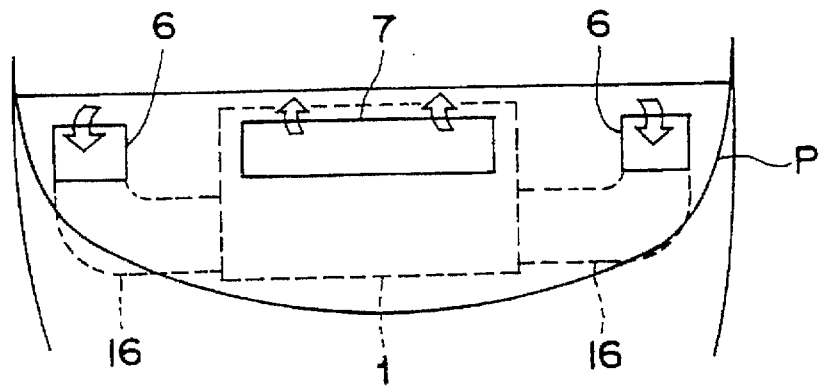
FIG. 11 is a plan view of the rear parcel panel of the vehicle, showing a first modification of the air inlet port and blowoff port.
Figure 12:
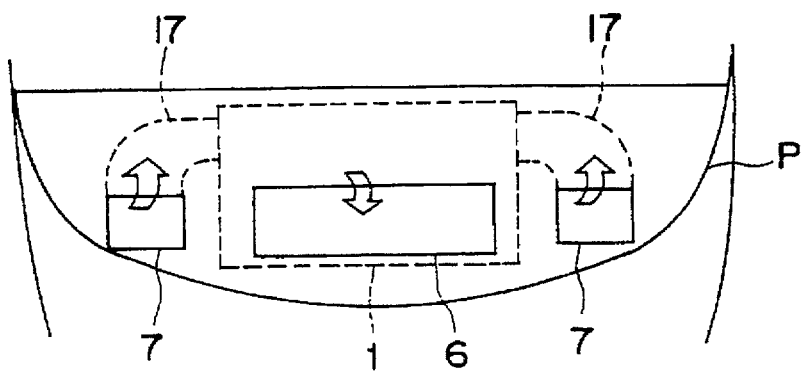
FIG. 12 is a plan view of the rear parcel panel of the vehicle, showing a second modification of the air inlet port and blowoff port.

In the first embodiment, the air inlet port 6 and the air blowoff port 7 have been arranged in the front-and-rear direction of the vehicle. However, as shown in FIG. 11, it may also be arranged that the air blowoff port 7 is disposed at the center and the two air inlet ports 6 are disposed on both sides of the air blowoff port 7, where all of these are arranged in line. In this case, suction ducts 16 are provided so as to extend from the side faces of the casing 1 to the two air inlet ports 6. Otherwise, conversely as shown in FIG. 12, it is also possible that an air inlet port 6 is disposed at the center and two air blowoff ports 7 are disposed on both sides of the air inlet port 6, where all of these are arranged in line. In this case, also, ducts 17 are provided so as to extend from the side faces of the casing 1 to the two air blowoff ports 7.

Such arrangements of the air inlet port 6 and the air blowoff port 7 can be accomplished with high efficiency even if the vehicle has a rear parcel panel P of short length in the front-and-rear direction.

Figure 13:
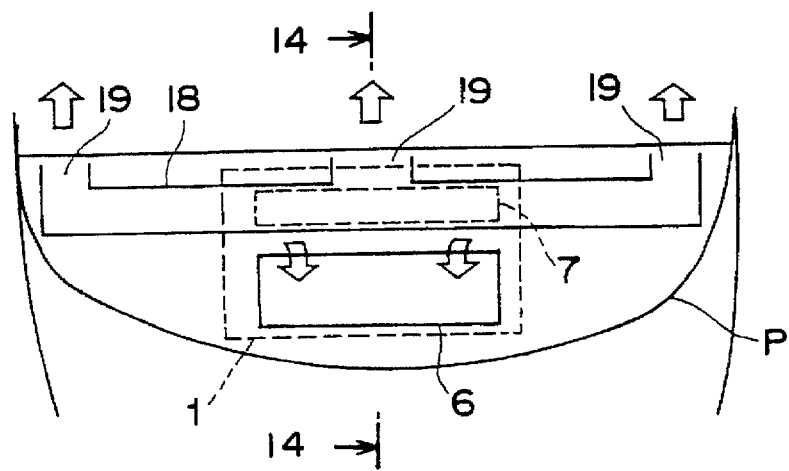
FIG. 13 is a plan view of the rear parcel panel of the vehicle, showing a third modification of the air inlet port and blowoff port.
Figure 14:
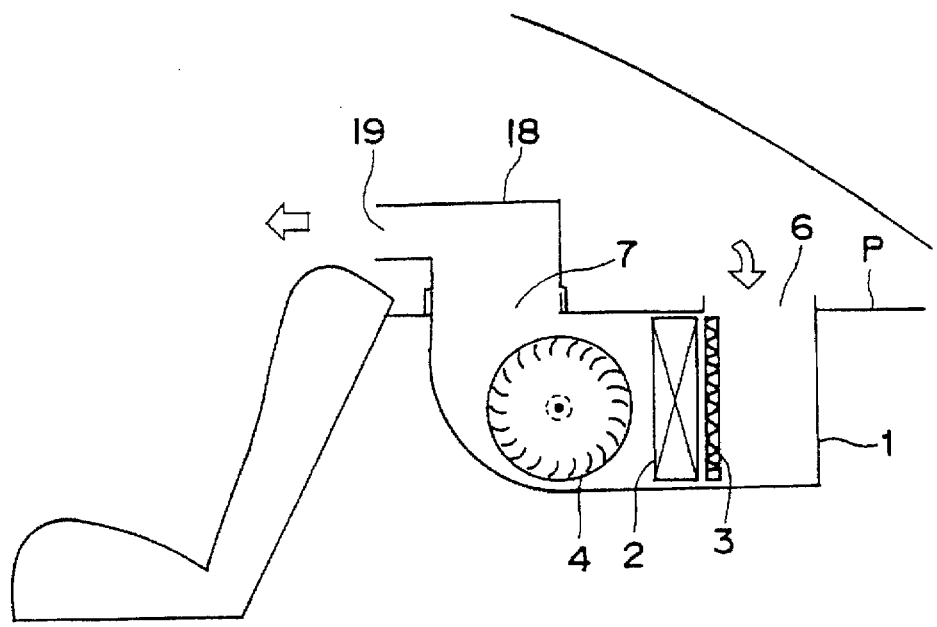
FIG. 14 is a sectional view taken along the line 14—14 of FIG. 13.

It is possible as well that, as shown in FIGS. 13 and 14, the air inlet port 6 and the air blowoff port 7 are disposed in the center of the rear parcel panel P, as in the arrangement of FIG. 4, while a blowoff duct 18 is provided on the rear parcel panel P and connected to the air blowoff port 7, so that air will be blown off toward the front of the vehicle through totally three small blowoff ports 19 which are provided at the center and both ends of the blowoff duct 18.

According to this arrangement, cool air is blown off from the center portion of the vehicle and the both side portions of the vehicle behind rear-seat passengers. Therefore, even when the rear-seat passengers receive the sunshine from the one side of the vehicle, the cool air blown off through the right-and-left small blowoff ports 19 serves as an air curtain and moreover the cool air strikes against the heads of the passengers, so that the comfortableness will not be impaired.

Also, the blowoff duct 18 is a linear, simplified one to be provided on the rear parcel panel P. As a result, the blowoff duct 18 involves less air-pass resistance, as compared with conventional ducts, so that appropriate air quantity can be maintained. Besides, the blowoff duct 18 becomes easy to install and low in cost.

Figure 15:
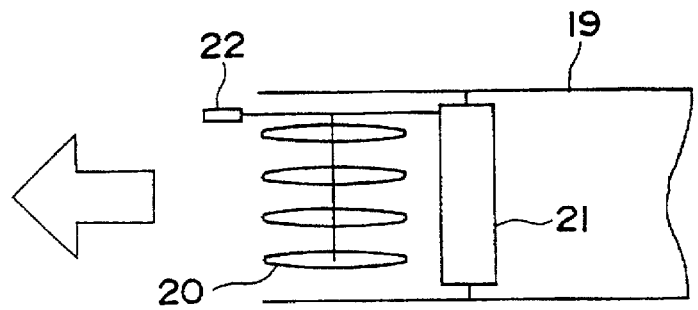
FIG. 15 is an enlarged section view showing a modification in which louvers are provided at small blowoff ports of the blowoff duct of FIG. 13.

In the small blowoff ports 19 of the blowoff duct 18, as shown in FIG. 15, may also be provided louvers 20 for changing the air direction in the vertical direction and louvers 21 for changing the air direction in the horizontal direction so as to be operable by a lever 22.

Figure 16:
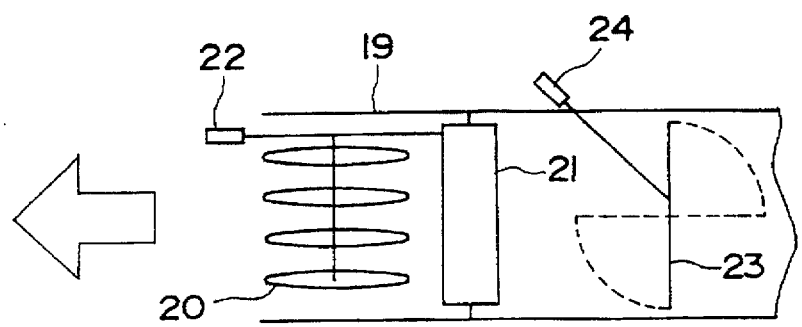
FIG. 16 is an enlarged sectional view showing a modification in which a door for closing and opening the small blowoff parts of FIG. 15 is provided.

Otherwise, upstream of the louvers 20, 21, as shown in FIG. 16, may be provided a door 23 for closing and opening the small blowoff ports 19 so as to be operable by a lever 24.

These louvers 20, 21 as well as the door 23 make it possible to control the direction and quantity of cool air at the discretion of rear-seat passengers.

Figure 17:
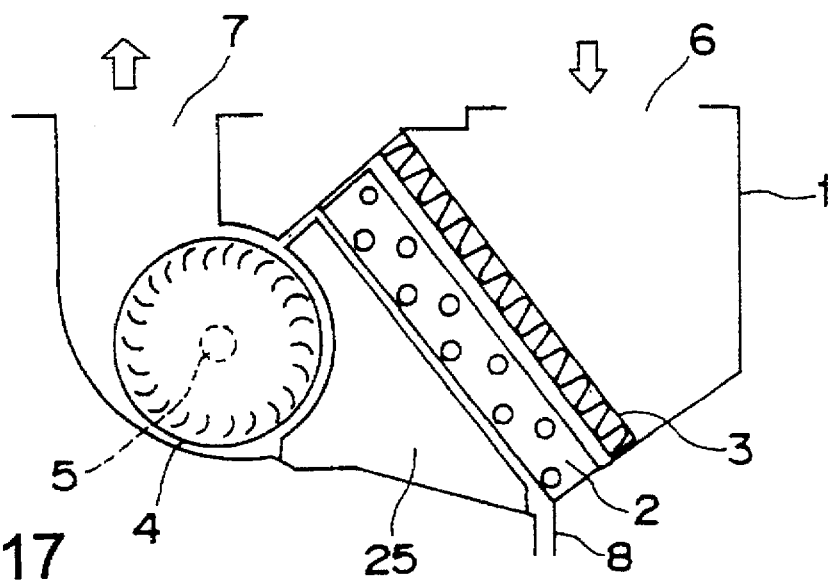
FIG. 17 is a sectional view of a rear cooler unit according to a second embodiment.
Figure 18:
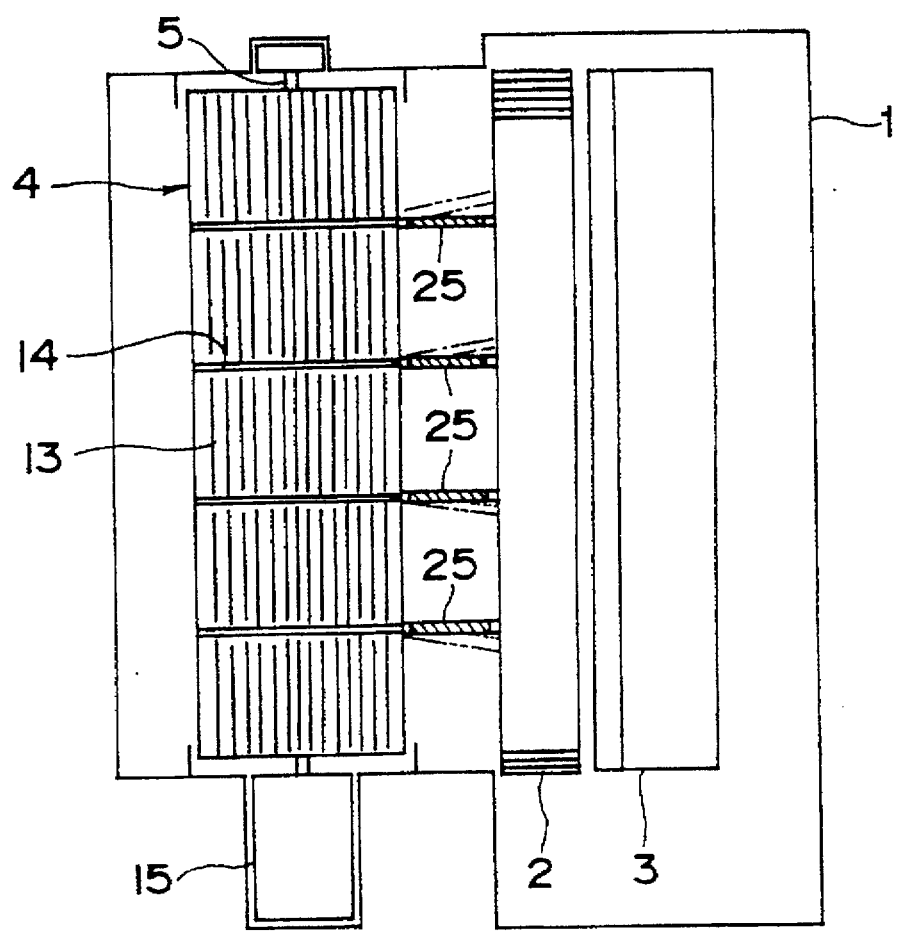
FIG. 18 is a plan view in section of FIG. 17.

FIGS. 17 and 18 illustrate a second embodiment of the present invention. This rear cooler unit is substantially the same as the rear cooler unit of the first embodiment of FIG. 1, except that partition walls 25 are provided between the heat exchanger 2 and the cross flow fan 4. In FIGS. 17 and 18, corresponding parts are designated by like numerals.

The partition walls 25 are disposed perpendicular to the rotating shaft 5 of the cross flow fan 4 on extended lines of the individual connecting plates 14 of the blades 13 of the cross flow fan 4, ranging from a peripheral vicinity of the cross flow fan 4 to an air-outlet-side vicinity of the heat exchanger 2.

These partition walls 25 do not need to be provided for all the individual connecting plates 14, but may be provided for every other coupling plate 14, or only at the center or only on both sides. They may also be provided not on the extended lines of the coupling plates 14 but obliquely as indicated by two-dot chain line in FIG. 18.

In the rear cooler unit in which the partition walls 25 are provided as described above, cool air flowing out of the heat exchanger 2 is separated and rectified by the partition walls 25, and sucked evenly into the individual fan scroll portions divided by the coupling plates 14 of the cross flow fan 4, being blown off into the inside of the vehicle through the air blowoff port 7. As a result, forced vortexes are generated uniformly at the individual fan scroll portions. Thus, occurrence of noise and foreign sounds due to surging is suppressed and a blowoff velocity distribution becomes uniform.

In addition, whereas the partition walls 25 may be provided integrally with the casing 1, they may also be formed independently of the casing 1 and incorporated thereinto.

Figure 19:
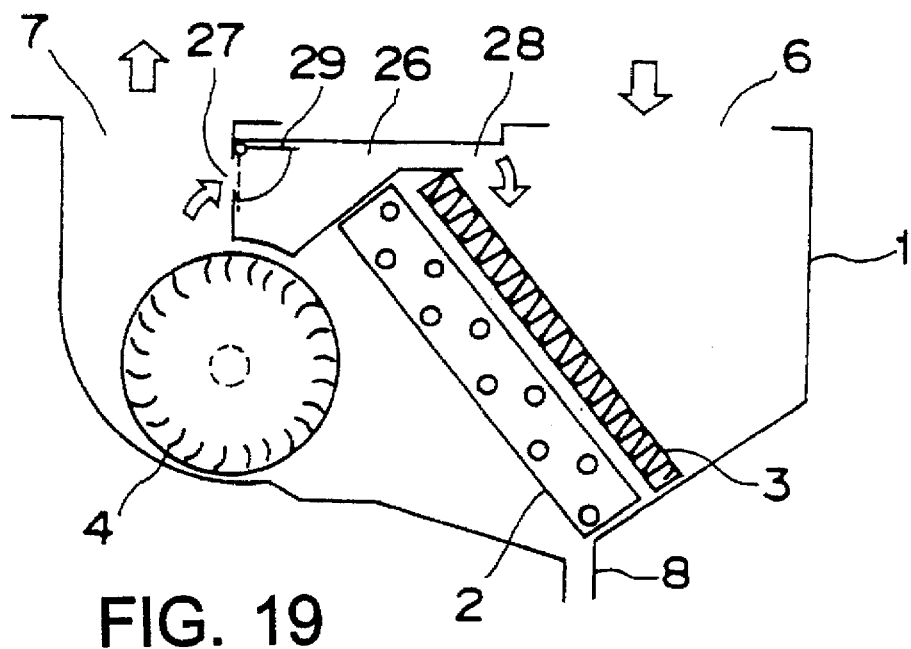
FIG. 19 is a sectional view of a rear cooler unit according to a third embodiment.

FIG. 19 illustrates a third embodiment of the present invention. This rear cooler unit is substantially the same as the rear cooler unit of the first embodiment of FIG. 1, except that an air return passage 26 is formed on the blowoff side of the cross flow fan 4. In FIG. 19, corresponding parts are designated by like numerals.

The air return passage 26 is so arranged as to communicate an opening 27 formed at the rising portion of the upper casing 1a on the air blowoff side of the cross flow fan 4 with an opening 28 formed at the rising portion of the upper casing 1a on the air inlet side of the heat exchanger 2. The opening 27 on the air blowoff side is provided with a return door 29 that is opened and closed by a motor based on a signal derived from an unshown manual switch or control unit. The return door 29 is not necessarily required. The opening 27 may be arranged to be normally opened.

In this embodiment, part of the air that is cooled by the heat exchanger 2 and blown off by the cross flow fan 4 passes through the air return passage 26 and returns to the inflow side of the heat exchanger 2, where the air is recooled by the heat exchanger 2 and blown out. Thus, the temperature of the air that is blown off through the air blowoff port 7 decreases.

When the rear cooler is operated after the vehicle has been parked for a long time under a burning sun, the hot air inside the vehicle around the rear window would not be cooled to a proper temperature only by once passing the heat exchanger 2. In such a situation, if the return door 29 has been kept open for a certain time at the time of operation start, part of the blown-off air is recooled, causing the blowoff temperature to lower. Thus, cool air can be obtained even immediately after the start, so that comfortable air conditioning can be effected.

Figure 20:
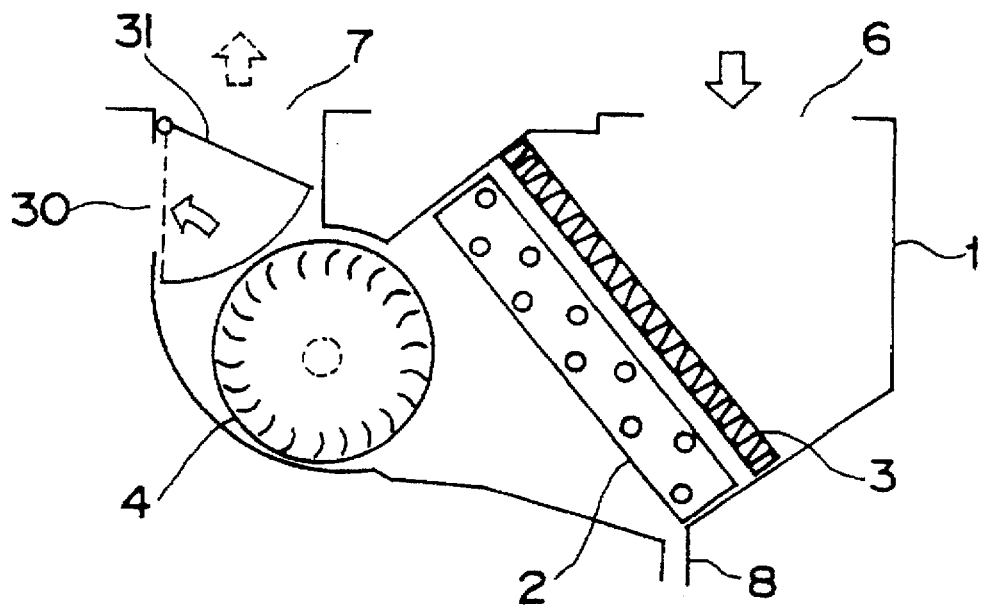
FIG. 20 is a sectional view of a rear cooler unit according to a fourth embodiment.

FIG. 20 illustrates a fourth embodiment of the present invention. This rear cooler unit is substantially the same as the rear cooler unit of the first embodiment of FIG. 1, except that an exhaust port 30 is provided on the blowoff side of the cross flow fan 4. In FIG. 20, corresponding parts are designated by like numerals.

The exhaust port 30 is formed at the rising edge of the casing 1 on the blowoff side of the cross flow fan 4 so as to communicate with the trunk room. The exhaust port 30 is provided with an exhaust door 31 that can be opened and closed by a motor based on a signal derived from an unshown manual switch or control unit so that the exhaust port 30 and the air blowoff port 7 can be switch over.

Under a situation where the air inside the vehicle has been polluted by cigarettes or exhaust gas, or where the inside air has been heated to high temperature over a long-time parking in a summer burning sun, when the exhaust door 31 is switched to the exhaust side so that the exhaust port 30 is opened, then the dirty air or hot air sucked through the air inlet port 6 will not return to the inside through the air blowoff port 7, but will be discharged out of the vehicle via the trunk room.

In addition, the following efficient operations can be performed by making use of the exhaust door 31 of this embodiment.

First, when the front cooler unit is put into the outside-air mode, the air quantity of the front cooler unit would decrease due to the resistance of the outside-air intake port. However, when the front cooler unit has been put into the outside-air mode, the exhaust door 31 of the rear cooler unit can be switched to the exhaust side in linkage with the mode change, so that the air quantity can be increased and therefore ventilation efficiency can be enhanced.

A sensor means such as a smoke sensor or an exhaust gas sensor may also be provided in the vehicle, so that the exhaust door 31 of the rear cooler unit is switched to the exhaust side based on a detection signal derived from such a sensor means, while the cross flow fan 4 is driven. Thus, the rear cooler unit can be used as an air cleaning means.

Figure 21:
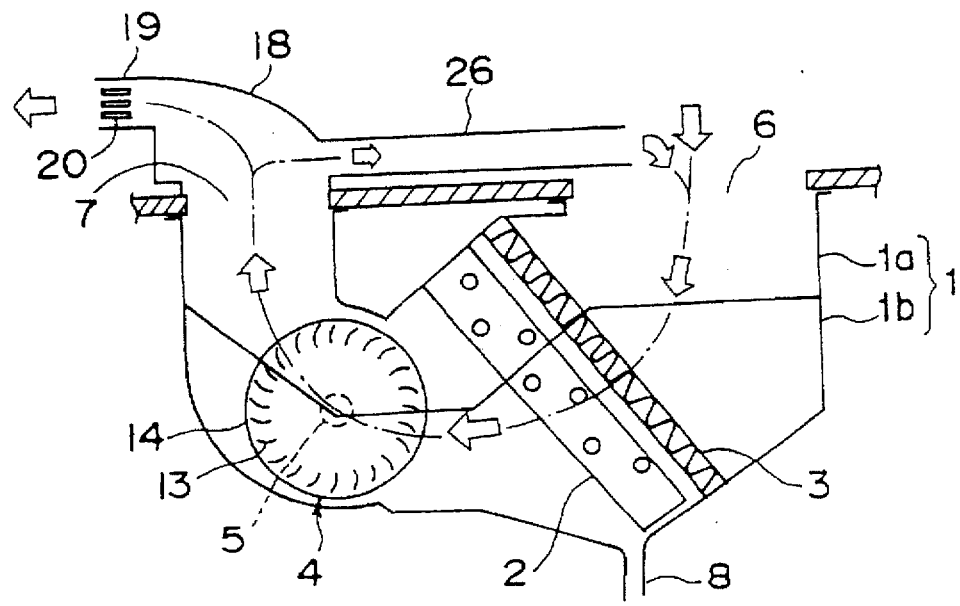
FIG. 21 is a sectional view of a rear cooler unit according to a fifth embodiment.

FIG. 21 illustrates a fifth embodiment of the present invention, which differs in that an air return passage 26 is provided in the blowoff duct 18 of the embodiment as shown in FIG. 13. Otherwise, it is substantially the same as the embodiment, corresponding parts being designated by like numerals.

To further describe the present embodiment, the air return passage 26 is branched from the blowoff duct 18 and led to a vicinity of the air inlet port 6.

The essential object of the air return passage 26 is to lower the blowoff temperature as described before. Another object is to decrease the air-pass resistance which will increase when the blowoff duct 18 is provided to the air blowoff port 7. More specifically, only with the provision of the blowoff duct 18, the sectional area of the blowoff duct 18 would be smaller than the opening area of the air blowoff port 7 and moreover the air-pass resistance would increase due to the louvers 20 provided to the small blowoff ports 19 and the like. Thus, the air return passage 26 is provided so as to be branched from the blowoff duct 18, whereby the air-pass sectional area is increased so that the air-pass resistance is decreased. As a result, occurrence of noise can be suppressed and decrease in air quantity can be prevented.

Although the present invention has been fully described by way of the examples with reference to the accompanying drawing, it is to be noted here that various changes and modifications will be apparent to those skilled in the art. Therefore, unless such changes and modifications otherwise depart from the spirit and scope of the present invention, they should be construed as being included therein.

What is claimed is:

1. A rear-air conditioning unit for use in a vehicle which is provided on a lower surface of a rear parcel panel of the vehicle, the unit comprising a heat exchanger which carries out a refrigerating cycle; an air blower means for sucking air contained in the vehicle to subject the air to heat exchange with a refrigerant contained in the heat exchanger and then blowing off the air into the vehicle; and a casing for accommodating the heat exchanger and the air blower means, wherein:

said air blower means comprises a cross flow fan having a plurality of axially extending blades arranged in row in a circumferential direction and connected axially with connecting plates interposed therebetween, and a fan motor which is connected to one end of a rotating shaft of the cross flow fan and which drives the cross fan into rotation, said rotating shaft of the cross flow fan being positioned in generally horizontal in a widthwise direction of the vehicle;

said heat exchanger is positioned on a suction side of the cross flow fan and generally parallel to said rotating shaft of the cross flow fan; and said casing comprises of an upper casing and a lower casing which are divided vertically by a plane containing said rotating shaft of the cross flow fan, said casing having an air inlet port and an air blowoff port provided in a front-and-rear direction of the vehicle and opened to said rear parcel panel, and an air passage formed in a generally U-shape which leads to said air blowoff port from said air inlet port; and wherein said air blowoff port of the casing is formed into a rectangular shape having a longer edge in the widthwise direction of the vehicle and a shorter edge in the front-and-rear direction of the vehicle;

a length a of the longer edge and a length b of the shorter edge of said air blowoff are respectively determined relative to a width L of the cross flow fan in a direction of its rotating shaft within ranges of $a/L \leq 1.10$; and $0.08 \leq b/L \leq 0.19$;

a height c of said blowoff port from said rotating shaft of the cross flow fan and its height e from the bottom of said casing beneath said cross flow fan are respectively determined relative to a diameter D of the cross flow fan within ranges of $c/D \geq 0.75$; and $e/D \leq 2.00$;

a rear guider is formed in said casing so as to extend from a blowoff-side lower portion of said cross flow fan to said air blowoff port, said rear guider being formed into a logarithmic spiral shape represented by $$R = (D/2)e^{A\theta},$$

where R is a distance from the center of the rotating shaft of the cross flow fan to the rear guider, D is the diameter of the cross flow fan, A is a factor represented by $\tan \alpha$, $\theta$ is an angle from a start point, and where the expansion angle $\alpha$ that determine the factor A is determined in a range of $\alpha = 8°$ to $13°$, and a tongue portion is formed in the casing so as to cover a blowoff-side upper part of said cross flow fan, where a horizontal length d from the center of the rotating shaft of said cross fan to the end of the tongue portion is determined relative to the diameter D of the cross flow fan in a range of $$0.40 \leq d/D \leq 0.65.$$

2. The rear air-conditioning unit for use in a vehicle according to claim 1, wherein either one of the air inlet port or the air blowoff port of said casing is disposed at the center and the other is disposed on both sides, and wherein both of them are disposed in the widthwise direction of the vehicle on said rear parcel panel.

3. The rear air-conditioning unit for use in a vehicle according to claim 1, wherein partition walls extending from a vicinity of said corresponding coupling plates of said cross flow fan to a vicinity of said heat exchanger are provided on the air inlet side of said cross flow fan, whereby the air passage to said cross flow fan is separated.

4. The rear air-conditioning unit for use in a vehicle according to claim 1, wherein a blowoff duct communicating with said air blowoff port is provided in the widthwise direction of the vehicle on said rear parcel panel, and small blowoff ports directed toward the front of the vehicle are provided at the center and on both sides of said blowoff duct.

5. The rear air-conditioning unit for use in a vehicle according to claim 1, wherein said casing is provided with an air return passage for communicating the air blowoff side of said cross flow fan with the air inlet side of said heat exchanger.

6. The rear air-conditioning unit for use in a vehicle according to claim 4, wherein the blowoff duct is provided with an air return passage for communicating said blowoff duct with the air inlet side of said heat exchanger.

7. The rear air-conditioning unit for use in a vehicle according to claim 1, wherein said casing is provided with an exhaust port for communicating the air blowoff side of said cross flow fan with a trunk space below the rear parcel panel, and an exhaust door that can selectively switch between said exhaust port and said air blowoff port.

\* \* \* \* \*